United States Patent [19]

Stack

[11] 3,957,640
[45] May 18, 1976

[54] LIQUID FILTER
[75] Inventor: Gary F. Stack, Holly, Mich.
[73] Assignee: General Motors Corporation, Detroit, Mich.
[22] Filed: May 27, 1975
[21] Appl. No.: 580,911

[52] U.S. Cl. ............................ 210/117; 210/130; 210/136
[51] Int. Cl.² ........................................ B01D 21/24
[58] Field of Search .......... 210/117, 136, 440, 441, 210/443, 444, 450, 130, 131, 132, 133, 163, 164, 165, 166, 446, 448; 4/287; 277/207 A; 49/484

[56] References Cited
UNITED STATES PATENTS

| | | | |
|---|---|---|---|
| 2,542,254 | 2/1951 | Lamb | 210/136 |
| 2,649,245 | 8/1953 | Silverstolpe | 210/DIG. 24 |
| 3,199,156 | 8/1965 | Riegelman | 49/484 |
| 3,231,089 | 1/1966 | Thorton | 210/130 |
| 3,305,095 | 2/1967 | Hathaway | 210/136 |
| 3,520,541 | 7/1970 | Rohani | 277/207 A |
| 3,529,722 | 9/1970 | Humbert | 210/130 |
| 3,557,958 | 1/1971 | Baldwin | 210/136 |
| 3,567,023 | 3/1971 | Buckman | 210/443 |
| 3,589,517 | 6/1971 | Palmai | 210/130 |
| 3,868,325 | 2/1975 | Otto | 210/446 |

Primary Examiner—Charles N. Hart
Assistant Examiner—Ernest G. Therkorn
Attorney, Agent, or Firm—Ronald L. Phillips

[57] ABSTRACT

An oil filter having an elastomeric anti-drainback valve with an integral flap that deflects within the tolerance stack-up of the assembled filter parts to effect sealing in lieu of requiring, for example, the conventional metal spring bias.

2 Claims, 4 Drawing Figures

LIQUID FILTER

This invention relates to liquid filters and more particularly to an oil filter having an elastomeric anti-drainback valve with an integral self-loading seal.

In the prior art of liquid filters, such as, an engine oil filter, it is common practice to use an elastomeric valve which operates to prevent oil from draining back to the engine during shut-down. In such oil filters there is a certain tolerance stack-up of the assembled parts and typically either a metal spring or even crushing of the filter media is utilized to maintain a load on the so-called anti-drainback valve to effect tight sealing between the valve and adjoining parts. Since oil filters are a very high volume production item, there is considerable desire to simplify their design and reduce their cost.

According to the present invention a very simple modification to an existing elastomeric anti-drainback valve provides for the elimination of a part, namely a metal spring, which is significant for such a competitive product. This modification merely requires the addition of a strategically arranged integral conical flap formed on the anti-drainback valve that deflects on assembly within the tolerance stack-up of the assembled parts to effect tight sealing without requiring the conventional metal spring to provide this sealing load.

An object of the present invention is to provide a new and improved liquid filter.

Another object is to provide in a liquid filter an elastomeric anti-drainback valve having an integral self-loading seal.

Another object is to provide in a liquid filter an elastomeric anti-drainback valve having an integral self-loading seal that deflects within the tolerance stack-up of the assembled filter parts to effect sealing in lieu of requiring loading by additional separate means.

These and other objects of the present invention will be more apparent from the following description and drawing in which.

Figure 1:
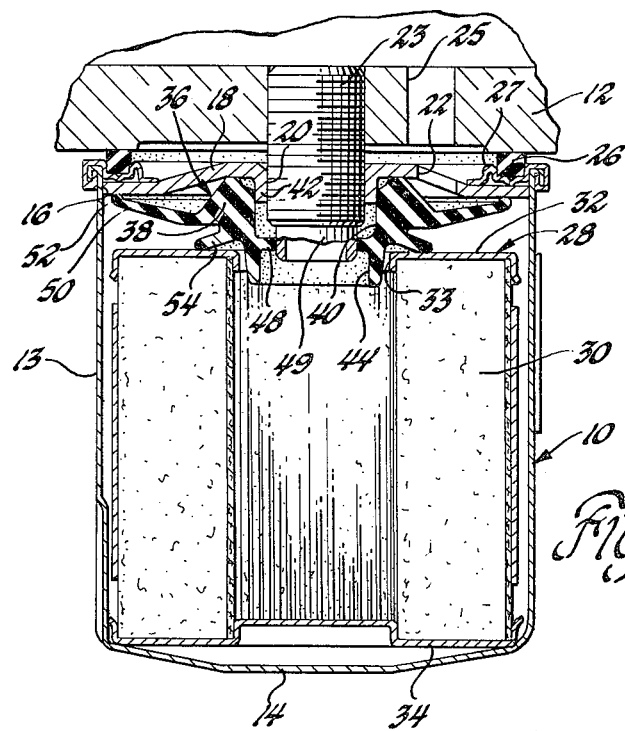
FIG. 1 is a longitudinal view with parts in section of an engine oil filter having an elastomeric anti-drainback valve with integral self-loading seal according to the present invention.
Figure 2:
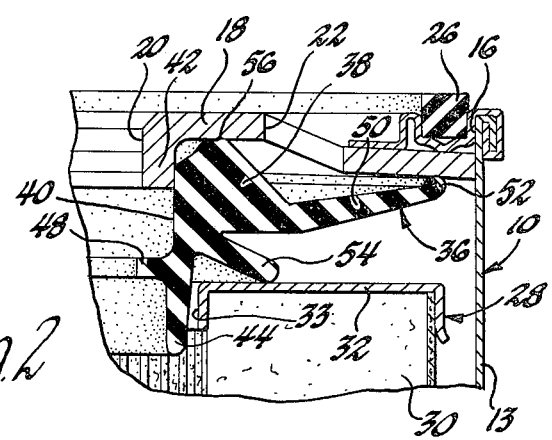
FIG. 2 is an enlarged view of a portion of FIG. 1 but with the filter disconnected from the engine.

Referring to FIG. 1 there is shown an oil filter 10 for filtering the oil used in an engine 12. The filter comprises a cylindrical canister 13 having a closed end 14 and an open end 16. The open end is closed by a closure plate 18 having a central fluid outlet 20 and a plurality of fluid inlets 22 that are circularly arranged around the outlet. The outlet 20 is threaded to engage a return pipe 23 extending from the engine while the inlets 22 are open to a filter feed passage 25 in the engine radially inwardly of a circular gasket 26. The gasket 26 is mounted on a separate plate 27 whose outer periphery is rolled over together with the open end of the canister 13 to be thereby secured to the canister and also retain the closure plate 18 against outward movement. A hollow cylindrical filter cartridge 28 is positioned in the canister and includes a suitable filter element 30 of the pleated paper type. The outer side of the filter element is spaced radially inward from the canister's cylindrical wall so that oil entering through the inlets 22 may flow to the outside of the cartridge and then radially inwardly through the filter element to the hollow axially extending center and thence to the return pipe 23. The filter cartridge further includes end cover plates 32 and 34 which fit over and are sealingly secured to the opposite ends of the filter element to provide support therefor as well as provision for holding the cartridge in position in the canister. The end cover 32 has a central opening 33 through which filtered oil passes to the outlet 20 while the other end cover 34 has no openings therethrough and is engageable with the canister's closed end 14.

To prevent oil from draining back out the inlets 22 there is provided an anti-drainback valve 36 of elastomeric material which is located between the filter cartridge end cover 32 and closure plate 18. In such an arrangement the filter cartridge 28 needs to be held against the canister's closed end 14 and the anti-drainback valve needs to sealingly engage the adjoining sandwiching parts. Because of the axial tolerance stack-up of the parts of the filter assembly, there is normally employed a metal spring between the canister's closed end 14 and the cartridge end cover 34. It has even been suggested to use a special cartridge that crushes during assembly to accommodate the tolerance stack-up. However, according to the present invention the elastomeric anti-drainback valve 36 is so formed as to be self-loading during assembly so that no metal spring or crushing of the filter cartridge is required to effect proper positioning and tight sealing within the assembly.

The anti-drainback valve 36 which is formed of elastomeric material has an annular body 38 arrangeable between the closure plate 18 and the filter cartridge's end cover 32. The body 38 has a central opening 40 through which the filter oil can pass to the outlet 20, the closure plate 18 being provided with an inwardly extending annular flange or collar 42 about the outlet which fits in the body opening 40 to thus coaxially locate the valve with the closure plate. The valve body 38 additionally has an axially extending annular collar 44 which locates in the central opening 33 of the cartridge's end cover 32 to provide a coaxial relationship between the valve and the filter cartridge at this end, the filter cartridge at the other end being centrally located in the canister by its end cover 34 as shown in FIG. 1. In addition, the neck 44 has a radially inwardly extending annular rib 48 for sealingly engaging a smooth shoulder 49 that can be formed on the end of the inlet pipe 23.

Describing now the valve structure, the body 38 has a flexible, radially and axially outwardly, annular valve portion 50 of frustoconical shape with a lip 52 on its outer perimeter that in the absence of oil pressure normally seats on the closure plate 18 radially outward of the inlets 22 to thus prevent oil in the filter assembly from draining back out the inlets. The valve portion 50 diverges axially outward and is flexible to lift off the closure plate in response to pressure build-up at the inlets 22 to permit flow to the filter cartridge.

Figure 3:
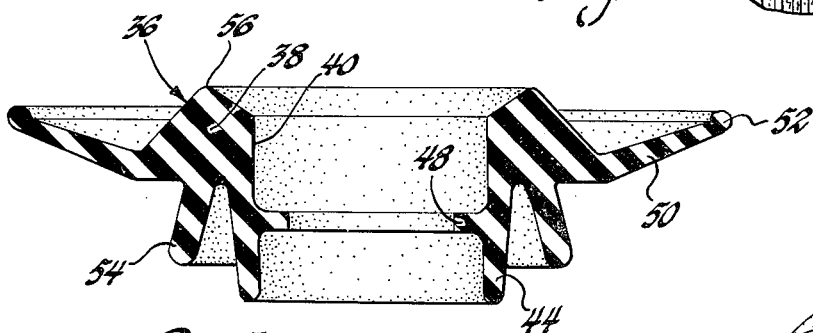
FIG. 3 is an enlarged view of the elastomeric anti-drainback valve in FIG. 1 but prior to assembly.
Figure 4:
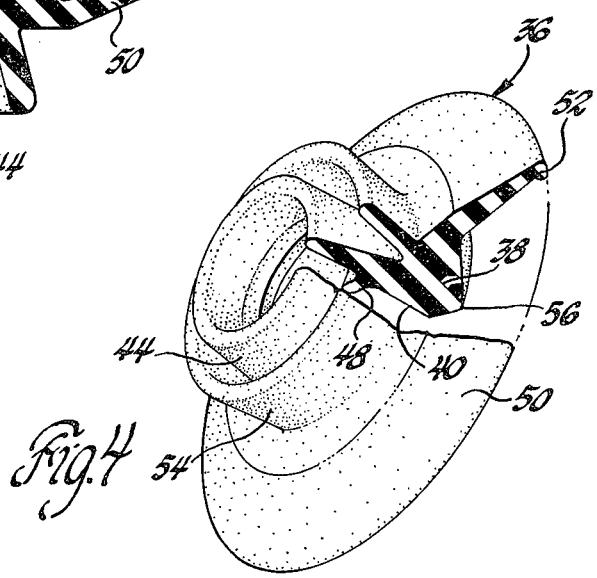
FIG. 4 is an enlarged perspective view of the elastomeric anti-drainback valve in FIG. 1 but prior to assembly.

For the purposes of axially positioning the filter cartridge and providing tight sealing between the valve body 38 and both the closure plate 18 and the end cover 32 to thus insure that the oil is forced to pass through the filter rather than leaking directly to the outlet, the valve body is according to the present invention additionally provided with a flexible, radially and axially outwardly extending annular cartridge loading and sealing portion 54 of frustoconical shape which diverges axially outward and opposite from that of the valve portion. As shown in FIGS. 3 and 4, the integral cartridge loading and sealing portion 54 which may also be described as a flap normally extends a substantial axial distance from the body 38 prior to assembly and in a direction to engage the cartridge's end cover plate 32 radially outwardly of and about the central opening 33. The axial extent of the cartridge loading and sealing portion 54 is determined according to the maximum possible tolerance stack-up of the filter assembly parts so that when the closure plate 18 is held in place to close the open end of the canister 13 the body 38 is compressively loaded and the cartridge loading and sealing portion flexes in a radially outward direction and transmits and distributes an axial force about and on the cartridge's end cover plate 32. This forces the other cartridge end cover plate 34 against the closed canister end 14 while sealing is provided between the inlets 22 and the outlet 20 by the compressively loaded body 38 sealingly engaging the closure plate 18 over a substantial annular area between the inlets and the outlet, this being assured by the formation of an annular lip 56 on this end of body 38 that flattens against the closure plate 18. Concurrently, the cartridge loading and sealing portion 54 in the flexed or loaded condition sealingly engages the cartridge end cover plate 32 over a substantial area radially outwardly of the communicating central openings in the body 38 and the cartridge end cover plate 32. Thus, there is now no need for a separate load spring. Furthermore, by flexing outwards the seal between the anti-drainback valve 36 and the cartridge 28 improves with increasing differential pressure across the oil filter as this same pressure differential will also act to push the flap 54 inward with increased force on the cartridge's end cover 32.

Thus, with the present invention there is effected elimination of the normal metal spring from the filter assembly and thus a cost savings assembly, there is provided improved sealing between the anti-drainback valve and the filter element, and there is eliminated, of course, the assembly operation attendant the use of a separate metal spring.

The above described embodiment is illustrative of the invention which may be modified within the scope of the appended claims.

I claim:

1. A liquid filter assembly comprising a can having a closed end and an open end, a filter cartridge arranged in said can having an exterior side for receiving unfiltered liquid and an interior side forming a central opening to which filtered liquid is delivered, a closure member closing said open end of said can having an inlet for delivering unfiltered liquid to said exterior cartridge side and an outlet for receiving filtered liquid from said cartridge opening, an elastomeric member having an annular body arranged between said closure member and one end of said filter cartridge, said body having a central opening communicating said cartridge opening with said outlet, said body having a flexible annular valve portion normally seating along its outer perimeter on said closure member radially outward of said inlet to prevent liquid in said filter assembly from draining back out said inlet and flexible to lift off said closure member in response to pressure build-up at said inlet to permit flow to said filter cartridge during normal filter flow operation, and said body also having a flexible annular cartridge loading and sealing portion normally extending a predetermined substantial axial distance from said body prior to assembly for engaging said one cartridge end radially outwardly of and about said cartridge opening so that on assembly of said closure member said body is compressively loaded and said cartridge loading and sealing portion flexes in a radially outward direction and transmits and distributes an axial force about and on said one cartridge end to force the other cartridge end against said closed can end while sealing is provided between said inlet and outlet by the compressively loaded body sealingly engaging said closure member over a substantial annular area extending between said inlet and outlet and also by said cartridge loading and sealing portion in the flexed condition sealingly engaging said one cartridge end over a substantial annular area radially outward of said communicating central openings in said body and cartridge.

2. A liquid filter assembly comprising a can having a closed end and an open end, a filter cartridge arranged in said can having an exterior side for receiving unfiltered liquid and an interior side forming a central opening to which filtered liquid is delivered, a closure member closing said open end of said can having an inlet for delivering unfiltered liquid to said exterior cartridge side and an outlet for receiving filtered liquid from said cartridge opening, an elastomeric member having an annular body arranged between said closure member and one end of said filter cartridge, said body having a central opening communicating said cartridge opening with said outlet, said body having a flexible frustoconical annular valve portion normally seating along its outer perimeter on said closure member radially outward of said inlet to prevent liquid in said filter assembly from draining back out said inlet and flexible to lift off said closure member in response to pressure build-up at said inlet to permit flow to said filter cartridge during normal filter flow operation, and said body also having a flexible frustoconical annular cartridge loading and sealing portion opposite in convergence relative to said valve portion normally extending a predetermined substantial axial distance from said body prior to assembly for engaging said one cartridge end radially outwardly of and about said cartridge opening so that on assembly of said closure member said body is compressively loaded and said cartridge loading and sealing portion flexes in a radially outward direction and transmits and distributes an axial force about and on said one cartridge end to force the other cartridge end against said closed can end while sealing is provided between said inlet and outlet by the compressively loaded body sealingly engaging said closure member over a substantial annular area extending between said inlet and outlet and also by said cartridge loading and sealing portion in the flexed condition sealingly engaging said one cartridge end over a substantial annular area radially outward of said communicating central openings in said body and cartridge.

* * * * *